United States Patent [19]

Yamamori et al.

[11] Patent Number: 4,774,080
[45] Date of Patent: Sep. 27, 1988

[54] HYDROLYZABLE RESIN COMPOSITION AND AN ANTIFOULING COATING COMPOSITION CONTAINING THE SAME

[75] Inventors: Naoki Yamamori, Minoo; Hiroharu Ohsugi, Itami; Yoshio Eguchi, Ikeda; Junji Yokoi, Ikoma, all of Japan

[73] Assignee: Nippon Paint Co., Ltd., Osaka, Japan

[21] Appl. No.: 863,998

[22] Filed: May 16, 1986

[30] Foreign Application Priority Data

May 17, 1985 [JP] Japan .................... 60-106434

[51] Int. Cl.$^4$ .................... C08K 5/48; C08K 5/09
[52] U.S. Cl. .................... 424/78; 424/81; 523/122; 525/330.2; 525/370
[58] Field of Search .................... 526/343, 344, 240; 524/394, 395, 398, 399; 525/330.2, 370; 424/78.81

[56] References Cited

U.S. PATENT DOCUMENTS

| | | | |
|---|---|---|---|
| 4,150,067 | 4/1979 | Dawans et al. | 525/370 |
| 4,429,094 | 1/1984 | Massucco | 526/240 |
| 4,465,795 | 8/1984 | Sunano et al. | 523/122 |

FOREIGN PATENT DOCUMENTS 62-84168   4/1987   Japan .................... 525/370

Primary Examiner—Joseph L. Schofer
Assistant Examiner—Peter F. Kulkosky
Attorney, Agent, or Firm—Wenderoth, Lind & Ponack

[57] ABSTRACT

A hydrolyzable resin composition consisting essentially of a resin selected from the group consisting of an acrylic resin, a polyester resin and an epoxy resin and an organic solvent in which the resin is soluble, wherein said resin has at least one side chain bearing at least one terminal group of the formula:

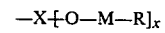

wherein X represents

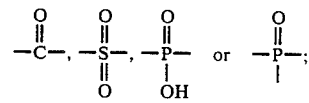

M is a metal selected from zinc, copper and tellurium; x is an integer of 1 to 2; R represents an organic acid residue selected from

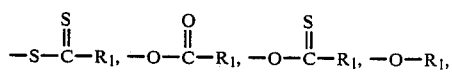

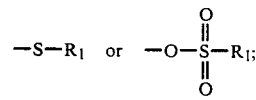

and $R_1$ is a monovalent organic residue, and the metal content of said resin is 0.3 to 20% by weight of the resin.

The subject composition provides superior antifouling coating compositions.

4 Claims, No Drawings

HYDROLYZABLE RESIN COMPOSITION AND AN ANTIFOULING COATING COMPOSITION CONTAINING THE SAME

FIELD OF THE INVENTION

The present invention relates to a hydrolyzable resin composition. More specifically, the invention concerns a hydrolyzable resin composition based on the resin having at least one side chain bearing a particular metal containing terminal group. The invention also conerns an antifouling coating composition containing said hydrolyzable resin composition as a resinous vehicle.

BACKGROUND OF THE INVENTION

Today, it is a very common to apply onto a ship's bottom and the like an antifouling coating composition comprising an organic or inorganic antifouling agent and a resinous binder, such as a vinyl resin, alkyd resin and the like.

In that case, since the antifouling effect is fully dependent on the antifouling agent dissolved out of the coating and the dissolution of said agent is primarily a diffusion phenomenon caused by a concentration gradient of said agent in the coating, one cannot except a long lasting, stable antifouling effect with them.

Further more, since the water insoluble resinous component will, after dissolution of said agent from the coating, form a skeleton structure, there are additional problems as increase in resistance of friction between the ship surface and water, lowering of sailing speed, increase in sailing fuel and the like. Under the circumstances, an antifouling coating composition comprising an antifouling agent and a hydrolyzable resin vehicle capable of forming a comparatively tough coating and being gradually decomposed by hydrolysis in sea water has become the center of public attention.

The present inventors has already found that a class of polyester resins having a number of metal-ester bondings in their polyester backbone chains are useful as a resinous vehicle in a polishing type antifouling paint, and applied for patent as Japanese Patent Application Nos. 165922/81 and 196900/83.

Such resins are easily hydrolyzed, under weak alkaline condition as in sea water, at the metal-ester bonding portions, are disintegrated into a number of small, low molecular weight segments and dissolved in sea water. However, said resins are primarily of comparatively low molecular weight (e.g. upto about 2000) and are poor in film-forming property, and therefore, said coating compositions still have the problems of easy occurence of cracks and peeling of the formed coatings.

If the molecular weight of said polyester resin is increased to a moderate level, it is indeed possible to improve the film-forming property, but, at that time, it will necessarily be attended with a marked decrease in hydrolysis property of the resin. To compensate the same, if the metal-ester bonding in the backbone chain of the resin is increased in number, this will cause additional problems that the resultant resin is only soluble in a polar solvent and not in most solvents commonly used in a coating composition, and that the formed coating is swollen with sea water. These attempts would therefore, give no fruitful results, and thus, there leaves much to be desired. An attempt has also been made to use a resin whose side chain has a trialkyl tin ester portion as a terminal group. In this type of resin, polarity of the resin is gradually increased in proportion to the progress in hydrolysis of said ester portion, and the resin is finally dissolved in sea water.

Typical examples of such resins are acrylic resins having as a constitutional element triorganotin salts of $\alpha,\beta$-unsaturated basic acids. In this case, in order to obtain a stabilized, tough coating, the resin should preferably be free from hydrophilic groups if circumstances allow, and in order to ensure the dissolution of the hydrolyzed resin in sea water, the resin should preferably have as many hydrophilic goups as possible, i.e. more than a certain critical range, after said hydrolysis.

Therefore, in the preparation of such resin by the copolymerization triorganotin salt of $\alpha,\beta$-unsaturated basic acid and other acrylic vinyl monomers, attempts have been made such that the former is presented in a higher concentration in the reaction system and the latter is selected from members with no or the least amount of hydrophilic groups. Thus, a copolymer of acrylate, acrylamide, styrene and the like containing 55 to 70 wt% of triorganotin salt of $\alpha,\beta$-unsaturated monobasic acid has been prepared and practically used.

In this type of resin, differing from the aforesaid polyester resin having metal-ester bondings in its main chain, hydrophilic carboxyl groups are generated at the time when the triorganotin portions at the side chains are released through hydrolysis and the resin is only dissolved in sea water at the stage where the concentration of said carboxyl groups get to a certain critical point. The film-forming property of the resin is also excellent. However, there is a problem in that a considerable quantity of highly expensive and toxic organotin compound is essential. Therefore, from both hygienic and economic point of view, it has long been desired to obviate the use of such material.

SUMMARY OF THE INVENTION

A principal object of the present invention is, therefore, to provide a novel type of hydrolyzable resin composition which has an excellent film-forming property and whose resin is characterized by having at the side chain portions a particular group capable of resulting a hydrophilic group through hydrolysis, being hydrolyzed and dissolved in sea water at an appropriate rate, and being prepared without the necessity of using a triorganotin compound which is an expensive and toxic material.

An additional object is to provide an antifouling coating composition based on said novel resin composition. According to the present invention, the aforesaid objects are attained by providing a hydrolyzable resin composition consisting essentially of a resin having at least one side chain bearing at least one terminal group of the formula:

wherein X represents

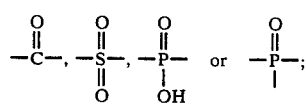

M is a metal selected from zinc, copper and tellurium; x is an integer of 1 to 2; R represents an organic acid residue selected from

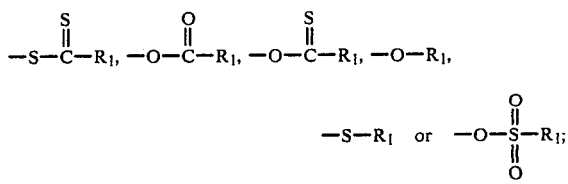

and $R_1$ is a monovalent organic residue, and an organic solvent in which said resin is soluble, and a coating composition containing as a resin vehicle said hydrolyzable resin composition.

PREFERRED EMBODIMENTS OF THE INVENTION

The novel hydrolyzable resin composition of this invention is characterized by comprising a resin which has at least one side chain bearing at least one terminal group of the aforesaid formula.

Such resin may be easily and advantageously prepared by either one of the following methods:

a method wherein a polymerizable unsaturated monomer having the desired organic acid metal ester bond at an end portion is first prepared and copolymerized with other polymerizable unsaturated monomer(s);

a method wherein a resin obtained by the copolymerization of a polymerizable unsaturated organic acid monomer with other polymerizable unsaturated monomer(s) is reacted with a monovalent organic acid and a metal oxide, chloride or hydroxide or is subjected to an ester exchange reaction with a monovalent carboxylic acid metal ester.

More specifically, the present resin composition may be prepared by either one of the following methods.

(1) A mixture of
 (a) a metal oxide, hydroxide, sulfide or chloride,
 (b) a monovalent organic acid or its alkali metal salt, and
 (c) a polymerizable unsaturated organic acid or its alkali metal salt is heated under stirring at a temperature lower than the decomposition temperature of the desired metal ester product, and the by-produced substances as alkali metal chloride, water, monovalent organic acid metal ester, bifunctional polymerizable unsaturated organic acid metal salt and the like are removed to obtain a purified metal ester between the polymerizable unsaturated organic acid and the monovalent organic acid. In the abovesaid reaction, it is not always necessary to use stoichiometric amounts of (a), (b) and (c) and one may use, in terms of equivalent ratio, (a):(b):(c)=1:0.8~3:0.8~2 to obtain the desired product.

Thus obtained metal ester betweenw the polymerizable unsaturated organic acid and the monovalent organic acid or the mixture of said metal ester and the monovalent organic metal ester is then subjected to a homopolymerization or a copolymerization with other copolymerizable monomer(s) to give the desired resin having at least one side chain bearing at least one metal ester containing terminal group.

(2) Alternatively, a mixture of
 (d) a resin having at a side chain an organic acid or its alkali metal salt,
 (e) a metal oxide, hydroxde, sulfide or chloride, and
 (f) a monovalent organic acid is heated under stirring at a temperature lower than the decomposition temperature of the desired metal ester containing resin, and the by-produced substances are removed, if desired, to obtain a resin having at least one side chain bearing the desired metal ester terminal group. As the ratio of these materials in this reaction, it is preferred to use, in terms of equivalent ratio, (d):(e):(f)=1:0.8~1.5:0.8~2 and more preferably 1:1.0~1.2:1.0~1.5.

When a low boiling monovalent organic acid is selected and the reaction is accompanied by a dehydration, there is a fear that the monovalent organic acid is distilled off together with water out of the system and a metal bonding occurs between the resins, thereby causing an increase in viscosity and gelation of the product, and therefore, it is preferred to use a higher amount of (f) than the abovesaid range.

(3) Alternatively, the desired product may be prepared by reacting a resin having at a side chain an organic acid (g) and a monovalent organic acid metal ester (h) at a temperature of not higher than the decomposition temperature of the desired product, thereby effecting an ester exchange reaction between the materials used.

In this reaction, when the selected monovalent organic acid is of a low boiling nature (as, for example, acetic acid), there is a fear that a metal ester bonding is liable to occur between the resins and therefore, the reaction should be carefully controlled.

Usually, the material (h) is used in an mount of 0.3 to 3 equivalent, more preferably 0.4 to 2.5 equivalent, per equivalent of organic acid in resin (g).

In the aforesaid methods, as the polymerizable unsaturated organic acid (c), the following may be advantageously used separately or in combination of two or more of them: methacrylic acid, acrylic acid, p-styrene sulfonic acid, 2-methyl-2-acrylamide propane sulfonic acid, methacryl acid phosphoxy propyl, methacryl 3-chloro-2-acid phosphoxy propyl, methacryl acid phosphoxy ethyl, itaconic cid, maleic acid, maleic anhydride, monoalkyl itaconate (e.g. methyl, ethyl, butyl, 2-ethyl hexyl and the like), monoalkyl maleate (e.g. methyl, ethyl, butyl, 2-ethyl hexyl and the like); half-ester of acid anhydride with hydroxyl containing polymerizable unsaturated monomer (e.g. half-ester of succinic anhydride, maleic anhydride or phthalic anhydride with 2-hydroxy ethyl(meth)acrylate.

As the monovalent organic acid (b), any of aliphatic, aromatic, alicyclic or heterocyclic organic acids may be advantageously used. Typical Examples of such acids are as follows:

acetic acid, propionic acid, levulinic acid benzoic acid, salicylic acid, lactic acid, 3,5-dichlorobenzoic acid, lauric acid, stearic acid, nitrobenzoic acid, linolenic acid, ricinoleic acid, 12-hydroxy stearic acid, fluoroacetic acid, pulvinic acid, abietic acid, mercaptobenzothiazole, o-cresotic acid, naphthol-1-carboxylic acid, p-phenyl benzene sulfonic acid, p-oxybenzoic acid, chloroacetic acid, dichloroacetic acid, naphthenic acid, β-naphthalene sulfonic acid, naphthol-1-sulfonic acid, 5-chloro-α,α-bis(3,5-dichloro-2-hydroxyphenyl) toluene sulfonic acid, p-phenyl benzoic acid, p-toluene sulfonic acid, p-benzene chlorosulfonic acid, dimethyl dithiocarbamic acid, diethyl dithiocarbamic acid, dibutyl dithiocarbamic aicd, lithocholic acid, phenoxyacetic acid, 2,4-dichlorophenoxy acetic acid, pivalicacid, valeric acid, various synthetic fatty acids and the like.

In the present invention, as the organic acid capable of being hydrolyzed to release the antifouling metallic ions from their bound form, any of the abovementioned acids may be satisfactorily used. However, if desired, the organic acid per se may also participate in the antifouling effect and at that time, selection is made of a monovalent organic acid having an antifouling property. Such acid may be easily selected from various organic acids customarily used as agricultural agents, medicins, repellents, fungicides, bactericides, preservatives and the like, by conducting a simple test wherein a sample amount of acid is placed in a cavity of test plate, the test plate is covered with a wire net and dipped in sea water for a defined period of time and thereafter, adhesion of marine livings on the wire net is examined. It would be quite easy for those skilled in the art to select an appropriate acid by the aforesaid test.

More specifically, the following are advantageously used fo this end.

(1)

bearing compounds:
aliphatic acid as levulinic acid; alicyclic acids as naphthenic acid chaulmoogric acid, hydrocarpusic acid, neoabietic acid, levo primaric acid, palustric acid, 2-methylbicyclo-2,2,1-heptane-2-carboxylic acid; aromatic carboxylic acids as salicylic acid, cresotic acid, α-naphthoic acid, β-naphthoic acid, p-oxy benzoic acid; halogen containing aliphatic acids as monochloro acetic acid,
monofluoro acetic acid; halogen containing aromatic acids as 2,4,5-trichloro phenoxy acetic acid, 2,4-dichloro phenoxy acetic acid, 3,5-dichloro benzoic acid; organo nitrogen containing acids as quinoline carboxylic acid, nitrio benzoic acid, dinitro benzoic acid, nitronaphthalene carboxylic acid; lactone series carboxylic acids as pulvinic acid, vulpinic acid; uracil derivatives as uracil-4-carboxylic acid, 5-fluoro uracil-4-carboxylic acid, uracil-5-carboxylic acid; penicillin structure bearing carboxylic acids as penicillin V, ampicillin, penicillin BT, penicillanic acid, penicillin G, penicillin O; Rifamycin B, Lucensomycin, Salcomycin, chloroamphenicol, variotin, Trypacidine and the like; and various synthetic fatty acids.

An alcoholic hydroxy containing antifouling agent may be reacted with an acid anhydride (e.g. succinic anhydride, maleic anhydride, phthalic anhydride, tetrahydrophthalic anhydride or the like) to obtain the corresponding half-ester and used as a monovalent organic acid having an antifouling property.

Examples of such hydroxy containing antifouling agents are testosterone, uridine, thymidine, L-menthol, cinnamic alcohol, citronellol, geraniol, β-phenyl ethyl alcohol, benzyl alcohol, maltol, Linalool, dimethyl benzyl carbinol, Rosinol and the like.

(2)

bearing compounds:
dimethyl dithiocarbamate and other dithiocarbamates
(3)

bearing compounds:
sulfur containing aromatic compounds as 1-naphthol-4-sulfonic acid, p-phenyl benzene sulfonic acid, β-naphthalene sulfonic acid, quinoline sulfonic acid
(4)

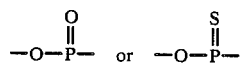

containing compounds:
various organophosphorous compounds as triethyl pyrophosphoric acid, dimethyl amino phosphate
(5) —S— bearing compounds:

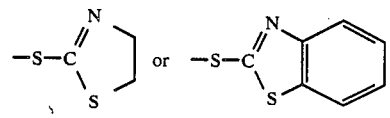

bearing compounds
(6)

bearing compounds: various thiocarboxylic acids
(7) —O— bearing compounds: phenol, cresol, xylenol, thymol, carvacol, eugenol, isoeugenol, phenyl phenol, benzyl phenol, gaujacol, butyl stilbene, (di) nitro phenol, nitro cresol, methyl salicylate, benzyl salicylate, mono-, di-, tri-, tetra- and penta-chlorophenol, chlorocresol, chloroxylenol, chlorothymol, p-chloro-o-cyclo-hexyl phenol, p-chloro-o-cyclopentyl phenol, p-chloro-o-n-hexyl phenol, p-chloro-o-benzyl phenol, p-chloro-o-benzyl-m-cresol and other phenols; β-naphthol, 8-hydroxy quinoline and the like.

By the selection of such acid, an organic acid residue of the formula:

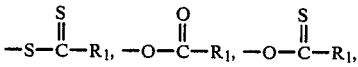

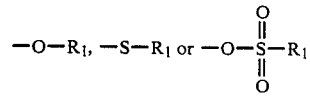

may be freely and successfully incorporated, in the form of metal ester, into a side chain of a resin, as a terminal group.

As already stated, said $R_1$ may be any kind of monovalent organic residues, and however, the inventors have also found that when said $R_1$ is a group of the formula:

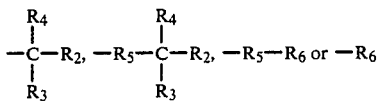

in which $R_2$ is hydrogen or a hydrocarbon residue having 1 to 12 carbon atoms, and $R_3$ and $R_4$ each represents a hydrocarbon residue having 1 to 12 carbon atoms $R_5$ is a hydrocarbon residue having 1 to 4 carbon atoms and $R_6$ is a cyclic hydrocarbon having 5 to 12 carbon atoms, there is a surprising effect such that it will cause a decrease in glass transition temperature of the produced resin, which in turn produces a plasticizing effect of the resin. In consequence, there results an increase in film strength and a marked improvement in crack resistance of the formed film. It is also of advantage to the film-forming property of the resin. Therefore, such acids are highly recommended as a monovalent organic acid.

Na metals (e.g. Sn, Pb, Si), VIa metals (e.g. Se), VIb metals (e.g. Cr, Mo), VIIb metals (e.g. Mn), and VIII metals (e.g. Fe, Co, Ni) may be used together with said particular metal(s). However, the present invention is characterized by using at least one of zinc, copper and tellurium as the metal component, which metals are lower in an ionization tendency than an alkali metal. These metals are generally used in the form of the oxide, hydroxide or chloride, but may be used in other forms, as halogenide other than chloride, nitrate, sulfate, carbonate and the like, if desired.

In an ester exchange reaction, if desired, the following tin compounds may be also used together with the aforesaid metal salts of organic acids:

dibutyl tin laurate, dibutyl tin stearate, dioctyl tin laurate, dioctyl tin stearate and the like.

As the aforesaid other polymerizable unsaturated monomers, any of the known monomers customarily used in the preparation of acrylic or vinyl resins may be successfully used. Examples of such monomers are methyl acrylate, methyl methacrylate, ethyl acrylate, ethyl methacrylate, propyl acrylate, propyl methacrylate, butyl acrylate, butyl methacrylate, octyl acrylate, octyl methacrylate, 2-ethyl hexyl acrylate, 2-ethyl hexyl methacrylate, styrene, vinyl toluene, vinyl pyridine, vinyl pyrrolidone, vinyl acetate, acrylonitrile, methacrylonitrile, dimethyl itaconate, dibutyl itactonate, di-2-ethyl hexyl itaconate, dimethyl maleate, di(2-ethyl hexyl)maleate, ethylene, propyrene, vinyl chloride and the like. If desired, hydroxy containing monomers as, for example, 2-hydroxy ethyl acrylate, 2-hydroxy ethyl methacrylate, 2-hydroxy propyl acrylate, 2-hydroxy propyl methacrylate and the like may also be used. As the resins (d) and (g) which have an organic acid group at a side chain, mention is made of organic acid bearing vinyl resins, polyester resins, oil modified alkyd resins, fatty acid modified alkyd resins, epoxy resins or the like. In the present resin, having at a side chain the aforesaid terminal group of monovalent organic acid metal ester bonding every organic acids in the side chains need not necessarily having such a particular metal ester bonding and some of them may be left unreacted in the form of free acid, if desired.

Regarding the molecular weight of the present resin obtained by either one of the abovesaid methods, there is no particular limitation on it, and however, as a resinous vehicle of an antifouling point, it is preferably determined in a range of, in terms of number average molecular weight, 4000 to 40000, and more preferably 6000 to 35000. This is because at a level of less than 4000, the film-forming property of the resin is insufficient and therefore, there is a fear that cracks and peeling of the formed coating are liable to occur, while at a level of more than 40000, storage stability of the coating composition is very poor and more over, there is a necessity of using a large amount of dilution solvent, which may cause additional problems in both economy and public health.

The resin composition of this invention has a characteristic feature such that when applied on a substrate as submarine structure and the like, thus formed coating is gradually hydrolyzed and dissolved out under alkaline atmosphere. Therefore, by making the most of the abovesaid property, numerous applications including fish net coating, capsulated agricultural chemicals and the like may be expected for the present resin composition. However, one of the most important applications is an antifouling paint containing the same.

As already stated, the present resin, differing from the heretofore known polyester having a number of metal ester bonds in its backbore chain, possesses an amount of metal ester bondings at the end portions of side chains. And, when hydrolyzed under alkaline atmosphere, the known polyester is decomposed into small segments and dissolved out at once, whereas in the present resin, hydrophilic groups are gradually formed at the side chain portions and the resin is dissolved out when the concentration of said hydrophilic groups reaches a certain critical point. Therefore, when used as a resinous vehicle in an antifouling coating composition, the antifouling action can be controlled for a longer period of time. For an optimum dissolution of the resin in sea water, the metal content is preferably determined in a range of 0.3 to 20%, more preferably 0.5 to 15%, by weight of the resin.

This is because, at a level of less than 0.3% by weight, the dissolution rate of the resin is too slow, whereas at a level of more than 20% by weight, it is too high, and both of the cases are undesired for the intended object.

There is no need for the acid value and hydroxyl number of the present metal containing resin being zero, and certain degree of acid value and hydroxyl number may be permissible, given the nature of being insoluble in sea water. More specifically, the permissible acid value of said resin is up to 40 KOH mg/g, and more preferably up to 30 KOH mg/g, and acceptable hydroxyl number is up to 200 KOH mg/g, more preferably up to 150 KOH mg/g.

The present resin composition may be applied as it is as a clear coating. However, any of the conventional additives such as pigment, solvent, and the like may be added to formulate an antifouling coating composition. Since the present resin composition comprises a resin capable of being hydrolyzed to generate an antifouling metal ion and in a preferred embodiment, an organic acid having an antifouling property, it is not always essential to add an additional antifouling agent to formulate an antifouling coating composition.

However, if desired, any of the known organic or inorganic antifouling agent or other toxic material may be added thereto. Examples of such materials are bis(tributyl tin)oxide, tributyl tin chloride, tributyl tin fluoride, tributyl tin acetate, tributyl tin nicotinate, tributyl tin versatate, bis(tributyl tin)$\alpha,\alpha'$-dibromosuccinate, triphenyl tin hydroxide, triphenyl tin nicotinate, triphenyl tin versate, bis(triphenyl tin)$\alpha,\alpha'$-dibromosuccinate, bis(triphenyl tin)oxide and other organo tin compounds. In formulating the present coating composition, any of the techniques customarily used in the related fields may be satisfactorily used. For example, the selected raw materials are combined and mixed well by means of ball-mill, pebble mill, roll mill, speed run mill and the like. The present antifouling coating composition is characterized by providing a coating capable of exhibiting a stabilized antifouling effect for a longer duration of time, which is as effective as known antifouling coating composition based on triorgano tin containing acrylic resin. Furthermore, since the present coating composition can be made without the necessity of fully relying on an expensive and toxic triorgano tin compound, the manufacturing cost can be markedly lowered and hygienic problem can be effectively obviated.

The invention shall be now more fully explained in the following Examples. Unless otherwise being stated, all parts and percentages are by weight.

REFERENCE EXAMPLE 1

Preparation of resin varnish A

Into a 4-necked flask fitted with a stirrer, a reflux condenser, and a dropping funnel, were placed 120 parts of xylene and 30 parts of n-butanol and the mixture was heated to maintain the temperature at 110° to 120° C. To this, a mixture of 60 parts of ethyl acrylate, 25 parts of 2-ethyl hexyl acrylate, 15 parts of acrylic acid, and 2 parts of azobis isobutyronitrile was dropwise added at a constant speed in 3 hours and after completion of said addition, the combined mixture was maintained at the same temperature for 2 hours. The thus obtained varnish A had a solid content of 39.8% and a viscosity of 2.2 poise.

REFERENCE EXAMPLE 2

Preparation of resin varnish B

Into a similar reaction vessel as used in Reference Example 1, were placed 75 parts of xylene and 75 parts of n-butanol and the mixture was maintained at 110° C. To this, a mixture of 50 parts of n-butyl methacrylate, 45 parts of methyl methacrylate, 5 parts of methacrylic acid, and 2 parts of benzoyl peroxide was dropwise added in 3 hours and the combined mixture was then maintained at the same temperature for 2 hours. Thus obtained resin solution had a solid content of 39.8% and a viscosity of 0.8 poise. To this, 46 g of 5 wt% sodium hydroxide methanol solution were added to obtain varnish B.

REFERENCE EXAMPLE 3

Preparation of resin varnish C

Into a similar reaction vessel as used in Reference Example 1, were placed 100 parts of xylene and the temperature was maintained at 100° to 110° C. To this, a mixture of 50 parts of methyl methacrylate, 42.4 parts of ethyl methacrylate, 7.6 parts of hydroxy ethyl methacrylate, and 1.6 parts of azobis isobutyronitrile was dropwise added in 3 hours and thereafter, the mixture was maintained at the same temperature for 2 hours. Next, 8.4 parts of phthalic anhydride and 8.4 parts of xylene were added and the combined mixture was maintained at 120° C. for 2 hours. Thus obtained varnish C had a solid content of 50.2% and a viscosity of 2.2 poise.

REFERENCE EXAMPLE 4

Preparation of resin varnish D

Into a similar reaction vessel as used in Reference Example 1, were placed 50 parts of xylene and 50 parts of methyl isobutyl ketone, and the mixture was maintained at 90° to 100° C. To this, a mixture of 5 parts of styrene, 5 parts of maleic anhydride, 90 parts of vinyl acetate and 1.5 parts of benzoyl peroxide was dropwise added in 5 hours, and the combined mixture was maintained at the same temperature for 4 hours. Thus obtained varnish D had a solid content of 48.2% and a viscosity of 3.6 poise.

REFERENCE EXAMPLE 5

Preparation of resin varnish E

Into a similar reaction vessel as used in Reference Example 1, were placed 70 parts of xylene and 30 parts of n-butanol and the mixture was maintained at 100° to 110° C. To this, a mixture of 50 parts of methyl methacrylate, 35 parts of n-butyl methacrylate, 15 parts of p-styrene sulfonic acid and 1.2 parts of azobisisobutyronitrile was dropwise added in 3 hours, and the combined mixture was maintained at the same temperature for 2 hours. Thus obtained varnish E had a solid content of 50.2% and a viscosity of 3.2 poise.

REFERENCE EXAMPLE 6

Preparation of resin varnish F

Into a similar reaction vessel as used in Reference Example 1, were placed 80 parts of xylene and 20 parts of n-butanol and the mixture was heated to 100° to 110' C. To this, a mixture of 50 parts of methyl methacrylate, 10 parts of 3-chloro-2-azide phosphoxy propyl, 5 parts of 2-hydroxy propyl methacrylate, 35 parts of n-butyl methacrylate, and 1.5 parts of azobis isobutyronitrile was dropwise added in 3 hours and the combined mixture was maintained at the same temperature for 2 hours. Thus obtained varnish F had a solid content of 49.9% and a viscosity of 4.3 poise.

EXAMPLE 1

Into a 4-necked flask fitted with a stirrer, a reflux condenser and a decanter, were placed 100 parts of varnish A, 20 parts of naphthenic acid (acid value 200 KOH mg/g) and 7 parts of copper hydroxide and the mixture was heated to 120° C. and maintained at the same temperature for 2 hours, while removing the formed water therefrom. (Dehydration amounts 2.5 g). Thus obtained varnish V-1 had a green color, a solid content of 51.3% and a viscosity of 2.2 poise. A sample varnish was subjected to a reprecipitation with white spirit and the Cu content of thus obtained green resin was analyzed by a fluorescence X-rays. It was found that the resin contained 6.8 wt% of Cu metal.

EXAMPLE 2

Into a 4-necked flask fitted with a stirrer and a reflux condenser, were placed 100 parts of varnish A and 25 parts of copper naphthenate and the mixture was heated under stirring at 80° C. for 2 hours.

To the mixture was added 38 parts of xylene to obtain varnish V-2, whose solid content was 39.9% and viscosity was 1.1 poise. The Cu content of thus obtained resin was analyzed in the same way as in Example 1 and was found to be 5.8 wt%.

EXAMPLE 3

Into a similar reaction vessel as used in Reference Example 2, were placed 100 parts of toluene, 100 parts of copper hydroxide, 86 parts of methacrylic acid and 275 parts of naphthenic acid and the mixture was heated, while removing the formed water under air bubbling, at 120° C. for 3 hours. Next, the remained insoluble substances were filtered to obtain a green colored toluene solution. From IR analysis of solid solute, the vinyl group and Cu carboxylate were detected. 100 parts of said xylene solution and 110 parts of xylene were placed in a similar reaction vessel as used in Reference Example 1, and the mixture was heated to 100° C. To this, a mixture of 150 parts of methyl methacrylate and 2 parts of azobisisobutyronitrile was dropwise added in 3 hours and the combined mixture was maintained at the same temperature for 2 hours. The thus obtained varnish V-3 had a solid content of 48.8% and a viscosity of 1.8 poise. The Cu content of the contained resin was analyzed in the same way as in Example 2 and it was found that Cu content was 1.8 wt%.

EXAMPLE 4

Into a 4-necked flask fitted with a stirrer and a reflux condenser, were placed 100 parts of varnish B, 5.5 parts of stearic acid, 1.7 parts of cupric chloride, and 1.0 part of nickel chloride and the mixture was reached at 120° C. for 2 hours. After filtering, a pale green colored varnish V-4 having a solid content of 38.2% and a viscosity of 1.2 poise was obtained. Metal contents of the contained resin were analyzed in the same way as in Example 2, and it was found that Cu content was 0.5 wt% and Ni content was 0.4 wt%.

EXAMPLE 5

Into a similar reaction vessel as used in Example 2, were placed 100 parts of varnish A and 23 parts of zinc stearate and the mixture was stirred at 120° C. for 2 hours and then diluted with 35 parts of xylene.

The thus obtained varnish V-5 had a solid content of 39.2% and a viscosity of 1.3 poise. The zinc content of the resin was analyzed in the same way as in Example 1 and was found to be 5.2 wt%.

EXAMPLE 6

Into a similar reaction vessel as used in Example 2, were placed 100 parts of varnish A, 15 parts of copper naphthenate and 10 parts of dibutyl tin laurate and the mixture was stirred at 80° C. for 2 hours and then diluted with 33 parts of xylene.

The thus obtained varnish V-6 had a pale yellow color, a solid content of 39.2% and a viscosity of 1.1 poise. The metal content of the resin was analyzed as in Example 1 and it was found that the Sn content was 2.3 wt% and Cu content was 2.1 wt%.

EXAMPLE 7

Into a similar reaction vessel as used in Example 2, were placed 100 parts of varnish A and 39 parts of zinc salt of 2-mercaptobenzothiazole and the mixture was stirred at 120° C. for 2 hours and then diluted with 31 parts of xylene to obtain varnish V-7 having a pale yellow color, a solid content of 46.4% and a viscosity of 1.3 poise. This varnish was subjected to a reprecipitation with methanol and the thus separated resin was analyzed in the same way as in Example 1. It was found that zinc content of the resin was 4.8 wt%.

EXAMPLE 8

Into a similar reaction vessel as used in Example 2, were placed 100 parts of varnish C and 20 parts of zinc dibutyl dithiocarbamate and the mixture was stirred at 120° C. for 2 hours and then diluted with 20 parts of xylene. The thus obtained pale brown colored varnish-8 had a solid content of 51.2% and a viscosity of 2.1 poise. The metal content of the resin was analyzed in the same way as in Example 1, and it was found that zinc content was 3.2 wt%.

EXAMPLE 9

Repeating the same procedures as in Example 8 but using 100 parts of varnish D, 22 parts of tellurium diethyl dithiocarbamate and 20 parts of n-butanol, a reddish brown colored varnish V-9 was obtained, whose solid content was 50.2% and viscosity was 3.2 poise. The tellurium content of the resin was analyzed in the same way as in Example 7, and it was found to be 6.0 wt%.

EXAMPLE 10

Into a similar reaction vessel as used in Example 2, were placed 100 parts of varnish D, 15 parts of zinc salicylate-$3H_2O$ and 15 parts of n-butanol and the mixture was stirred at 120° C. for 2 hours to obtain a pale brown colored varnish V-10. The solid content of the varnish was 49.8%, viscosity was 3.6 poise, and the zinc content of the resin was 5.7 wt%.

EXAMPLE 11

Into a similar reaction vessel as used in Example 2, were placed 100 parts of varnish E, 35 parts of copper naphthenate and 35 parts of xylene and the mixture was stirred at 80° C. for 2 hours to obtain a green colored varnish V-11, having a solid content of 50.2% and a viscosity of 2.8 poise. The copper content of the resin was analyzed in the same way as in Example 1 and it was found that the copper content was 5.2 wt%.

EXAMPLE 12

Into a similar reaction vessel as used in Example 1, were placed 100 parts of varnish F, 5.8 parts of p-toluene sulfonic acid, and 3.6 parts of copper hydroxide and the mixture was reacted as in Example 1.

The thus obtained green colored varnish V-12 had a solid content of 52.7% and a viscosity of 4.8 poise. Using the same procedure as stated in Example 7, the metal content of the resin was analyzed and it was found that copper content was 3.2 wt%.

EXAMPLE 13

Into a 4-necked flask fitted with a decanter, a condenser and a stirrer, were placed 20.4 parts of trimellitic anhydride, 6.8 parts of phthalic anhydride, 9.7 parts of butyl carbitol, 57.3 parts of coconut oil monoglyceride, 11.8 parts of coconut oil fatty alcohol, 0.2 part of dibutyl tin oxide and 5 parts of xylene, and the mixture was reacted at 180° to 220° C., while removing the formed water out of the system, for 9 hours. The reaction solution was allowed to cool to 160° C., added with 12.5 parts of succinic anhydride, stirred at 160° C. for 1 hour and then diluted with 50 parts of xylene and 10 parts of n-butanol.

To this, 13 parts of copper hydroxide and 28 parts of pivalic acid and the combined mixture was reacted, while removing the formed water, at 110° C. for 3 hours. After filtration, a resin varnish (Varnish V-13) having a solid content of 55.3 wt% was obtained. It was found that Cu content of the resin was 4.2 wt%.

COMPARATIVE EXAMPLE 1

The resin varnish A obtained in Reference Example 1 was used as Comparative varnish A.

COMPARATIVE EXAMPLE 2

Into a 4-necked flask fitted with a stirrer, a reflux condenser and a dropping funnel, were placed 100 parts of xylene and it was maintained at 80° to 85° C. To this, a mixture of 50 parts of methyl methacrylate, 40 parts of ethyl acrylate and 1.5 parts of azobisisobutyronitrile was dropwise added at a constant speed in 3 hours and thereafter, the combined mixture was maintained at the same temperature for 2 hours. 10 parts of copper naphthenate were then added and the mixture was stirred at 70° C. for 2 hours to obtain Comparative varnish B having a solid content of 50.2% and a viscosity of 5.2 poise.

The metal content of the resin was analyzed in the same way as in Example 1 and it was found that Cu content was less than 0.01 wt%.

COMPARATIVE EXAMPLE 3

Into a similar reaction vessel as used in Example 2, were placed 100 parts of varnish A and 24 parts of magnesium naphthenate and the mixture was stirred at 80° C. for 2 hours and then diluted with 38 parts of xylene. Thus obtained varnish (Comparative varnish C) had a solid content of 38.8%. The metal content of the resin was analyzed as in Example 1 and it was found that magnesium content was 5.6 wt%.

EXAMPLES 14 TO 28 AND COMPARATIVE EXAMPLES 4 TO 6

Using the materials shown in Table 1 and Table 2 and subjecting to a dispersion operation in ball mill for 5 hours, the respective coating composition was obtained. Each composition was then applied onto a test plate in about 200μ dry thickness, and thus prepared test plate was attached to Discrotor, immersed in sea water (18° to 23° C.) and rotated at a constant speed (peripheral speed 35 knots) for 3 months (days and nights). The use-up rate of the coating was determined microscopically. The results are shown in Table 3.

TABLE 1

| Example | 14 | 15 | 16 | 17 | 18 | 19 | 20 | 21 |
|---|---|---|---|---|---|---|---|---|
| resin varnish | | | | | | | | |
| V-1 | 50 | | | | | | | |
| V-2 | | 40 | | | | | | |
| V-3 | | | 45 | | | | | |
| V-4 | | | | 40 | 50 | | | |
| V-5 | | | | | | 35 | | |
| V-6 | | | | | | | 45 | |
| V-7 | | | | | | | | 50 |
| cuprous oxide | 25 | 30 | 25 | 20 | | 25 | 30 | 30 |
| cuprous thiocyanate | | | | | 25 | | | |
| zinc white | 10 | 10 | 15 | 15 | | 10 | | 10 |
| colloidal silica | 2 | 2 | 2 | 2 | 2 | 2 | 2 | 2 |
| titanium oxide | | 5 | 5 | 10 | 10 | 10 | 10 | |
| colcothar | 5 | 5 | 5 | 5 | | 5 | | |
| dioctyl phthalate | 5 | 5 | | 5 | 5 | 5 | | |
| n-butanol | 3 | 3 | 3 | 3 | 3 | 3 | 3 | 3 |
| xylene | | | | | 5 | 5 | 10 | 5 |
| total | 100 | 100 | 100 | 100 | 100 | 100 | 100 | 100 |

| Example | 22 | 23 | 24 | 25 | 26 | 27 | 28 |
|---|---|---|---|---|---|---|---|
| resin varnish | | | | | | | |
| V-8 | 50 | | | | | | |
| V-9 | | 45 | | | | | |
| V-10 | | | 50 | 45 | | | |
| V-11 | | | | | 45 | | |
| V-12 | | | | | | 40 | |
| V-13 | | | | | | | 35 |
| cuprous oxide | | 30 | 25 | 15 | 20 | 25 | 25 |
| cuprous thiocyanate | 20 | | | | | | |
| zinc white | 5 | 10 | 5 | 10 | 5 | 10 | 15 |
| colloidal silica | 2 | 2 | 2 | 2 | 2 | 2 | 2 |
| titanium oxide | 10 | 5 | 5 | 10 | 10 | 10 | 10 |
| colcothar | | 5 | 5 | 5 | 5 | 5 | 5 |
| dioctyl phthalate | | | 5 | 5 | 5 | 5 | 5 |
| n-butanol | 3 | 3 | 3 | 3 | 3 | 3 | 3 |
| xylene | 10 | | 5 | 5 | | | |
| total | 100 | 100 | 100 | 100 | 100 | 100 | 100 |

TABLE 2

| Comparative Example | 4 | 5 | 6 |
|---|---|---|---|
| compara. varnish | | | |
| A | 45 | | |
| B | | 40 | |
| C | | | 35 |
| cuprous oxide | 25 | 30 | 25 |
| zinc white | 10 | 10 | 10 |
| titanium oxide | 10 | 5 | 15 |
| colcothar | | 5 | 5 |
| colloidal silica | 2 | 2 | 2 |
| dioctyl phthalate | 5 | 5 | 5 |
| n-butanol | 3 | 3 | 3 |
| xylene | | | 5 |
| total | 100 | 100 | 100 |

TABLE 3

| | Coating use-up rate | | |
|---|---|---|---|
| | initial film thickness (μ) | film thickness after 3 months (μ) | used up film thickness (μ) |
| Example | | | |
| 14 | 195 | 140 | 55 |
| 15 | 210 | 175 | 35 |
| 16 | 180 | 165 | 15 |
| 17 | 205 | 195 | 10 |
| 18 | 200 | 185 | 15 |
| 19 | 185 | 145 | 40 |
| 20 | 200 | 155 | 45 |
| 21 | 210 | 180 | 30 |
| 22 | 195 | 165 | 30 |
| 23 | 190 | 150 | 40 |
| 24 | 180 | 135 | 45 |
| 25 | 210 | 160 | 50 |
| 26 | 200 | 175 | 25 |
| 27 | 205 | 190 | 15 |
| 28 | 195 | 145 | 50 |
| Compara. Ex. | | | |
| 4 | 205 | — | — |
| 5 | 210 | 210 | 0 |
| 6 | 195 | 195 | 0 |

The coating of comparative Example 3 was completely dissolved out after 3 months' test.

Next, the respective coating composition of Examples 14 to 28 and Comparative Examples 4 to 6 was applied twice by brushing onto a sand-blasted steel plate previously coated with an anti-corrosive paint, so as to give a coating of 100μ dry thickness each time. Thus prepared test plate was immersed in sea water for a defined period of time and the anti-fouling effect was examined.

This test was conducted at Aioi Bay, Hyogo Pref. The results are shown in Table 4.

TABLE 4

| | Antifouling test (surface area % adhered with submarine life) | | | | | | | | | | | |
|---|---|---|---|---|---|---|---|---|---|---|---|---|
| | duration of immersion (months) | | | | | | | | | | | |
| | 3 | 6 | 9 | 12 | 15 | 18 | 21 | 24 | 27 | 30 | 33 | 36 |
| Example | | | | | | | | | | | | |
| 14 | 0 | 0 | 0 | 0 | 0 | 0 | 0 | 0 | 0 | 0 | 0 | 0 |
| 15 | 0 | 0 | 0 | 0 | 0 | 0 | 0 | 0 | 0 | 0 | 0 | 0 |
| 16 | 0 | 0 | 0 | 0 | 0 | 0 | 0 | 0 | 0 | 0 | 0 | 10 |
| 17 | 0 | 0 | 0 | 0 | 0 | 0 | 0 | 0 | 0 | 0 | 10 | 20 |
| 18 | 0 | 0 | 0 | 0 | 0 | 0 | 0 | 0 | 0 | 0 | 0 | 10 |
| 19 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 5 |
| 21 | 0 | 0 | 0 | 0 | 0 | 0 | 0 | 0 | 0 | 0 | 0 | 0 |
| 22 | 0 | 0 | 0 | 0 | 0 | 0 | 0 | 0 | 0 | 0 | 0 | 0 |
| 23 | 0 | 0 | 0 | 0 | 0 | 0 | 0 | 0 | 0 | 0 | 0 | 0 |
| 24 | 0 | 0 | 0 | 0 | 0 | 0 | 0 | 0 | 0 | 0 | 0 | 0 |
| 25 | 0 | 0 | 0 | 0 | 0 | 0 | 0 | 0 | 0 | 0 | 0 | 0 |
| 26 | 0 | 0 | 0 | 0 | 0 | 0 | 0 | 0 | 0 | 0 | 0 | 0 |
| 27 | 0 | 0 | 0 | 0 | 0 | 0 | 0 | 0 | 0 | 0 | 0 | 0 |
| 28 | 0 | 0 | 0 | 0 | 0 | 0 | 0 | 0 | 0 | 0 | 0 | 0 |
| Compara. Ex. | | | | | | | | | | | | |
| 4 | 0 | 0 | 100 | 100 | discontinued (because of thorough dissolution of the coating) | | | | | | | |
| 5 | 0 | 5 | 30 | 100 | 100 | 100 | 100 | 100 | 100 | 100 | 100 | 100 |
| 6 | 0 | 5 | 10 | 30 | 100 | 100 | 100 | 100 | 100 | 100 | 100 | 100 |

From the foregoing, it was found that the resin compositions of this invention could result in coatings which were gradually hydrolyzed and dissolved in sea water at an appropriate rate.

Whereas, in the case of Comparative Example 4 based on Comparative varnish A in which the resin did not bear metal organic acid ester bonding at the end portion of side chains, the coating was rapidly dissolved in sea water because of the soluble nature of the contained resin and the desired antifouling effect could not last over 12 months. In the case of Comparative Example 5 based on Comparative varnish B in which the resin did not bear organic acid in the side chains, no dissolution of the coating was found and thus, the desired antifouling effect was very weak.

In the case of Comparative Example 6 based on Comparative varnish C, wherein the resin contained magnesium whose ionization tendency was higher than alkali metal, hydrolysis of the resin and hence the antifouling effect were very poor.

EXAMPLE 29

Into a similar reaction vessel as used in Example 1, were placed 100 parts of varnish A, 14.4 parts of 5-quinoline carboxylic acid and copper hydroxide and the mixture was heated to 120° C. and maintained at the same temperature for 2 hours, while removing the formed water from the system. A pale green colored varnish V-14 having a solid content of 50.4% and a viscosity of 2.5 poise was obtained. A sample amount of this varnish was subjected to a reprecipitation with white spirit, thus obtained resin was analyzed in the same way as in Example 1 and it was found that the Cu content was 3.1 wt%.

EXAMPLE 30

Into a similar reaction vessel as used in Example 4, were placed 100 parts of varnish B, 6.5 parts of sodium triethyl pyrophosphate and 3.3 parts of cupric chloride and the mixture was heated to 120° C. and maintained at the same temperature for 2 hours, while removing the formed water therefrom. The reaction mixture was filtered to obtain a varnish V-15, whose solid content was 41.4% and viscosity was 2.4 poise. The copper content of the resin was 1.0 wt%.

EXAMPLE 31

Into a similar reaction vessel as used in Example 1, were placed 100 parts of varnish A, 21 parts of L-menthol/succinic anhydride half ester and 8.0 parts of copper hydroxide and the mixture was heated to 120° C.

and maintained at the same temperature for 2 hours, while removing the formed water therefrom, to obtain a varnish V-16 having a solid content of 51.8% and a viscosity of 2.1 poise. This varnish was reprecipitated from n-hexane and thus obtained resin was analyzed in the same way as in Example 1. The copper content of the resin was 7.4 wt%.

EXAMPLE 32

Into a similar reaction vessel as used in Example 1, were placed 100 parts of varnish A, 14 parts of 5-fluorouracil-4-carboxylic acid and 8.0 parts of copper hydroxide and the mixture was heated to 120° C. and maintained at the same temperature for 2 hours, while removing the formed water therefrom, to obtain a varnish V-17 having a solid content of 50.9% and a viscosity of 2.4 poise. This varnish was reprecipitated from methanol and thus obtained resin was analyzed in the same way as in Example 1. The copper content of the resin was 6.9 wt%.

EXAMPLE 33

Into a similar reaction vessel as used in Example 1, were placed 100 parts of varnish A, 28.8 parts of penicillin V and 8 parts of copper hydroxide and the mixture was heated to 120° C. and maintained at the same temperature for 2 hours, while removing the formed water therefrom, to obtain a varnish V-18 having a solid content of 51.2% and a viscosity of 2.6 poise. This varnish was reprecipitated from methanol and thus obtained resin was analyzed in the same way as in Example 1. The copper content of the resin was 7.2 wt%.

EXAMPLES 34 TO 38

Using the varnishes of Examples 29 to 33 and the materials shown in Table 5 and subjecting to a dispersion operation in ball mill for 5 hours, coating compositions were prepared. The respective composition was applied onto a test plate in about 200μ dry thickness and thus prepared plate was attached to Discrotor, immersed in sea water and rotated at a constant speed for 3 months as in Examples 14 to 28. The test results are shown in Table 6.

Also, a second series of test plates were prepared using a sand-blasted steel plate previously coated with an anti-corrosive paint and the sea water immersion tests were carried out as in Examples 14 to 28. The test results are shown in Table 7.

TABLE 5

| Example | 34 | 35 | 36 | 37 | 38 |
|---|---|---|---|---|---|
| resin varnish | | | | | |
| V-14 | 40 | | | | |
| V-15 | | 45 | | | |
| V-16 | | | 50 | | |
| V-17 | | | | 40 | |
| V-18 | | | | | 40 |
| cuprous oxide | 30 | 25 | 15 | 25 | 15 |
| zinc white | 20 | 5 | 10 | 10 | 20 |
| colloidal silica | 2 | 2 | 2 | 2 | 2 |
| titanium oxide | 5 | 5 | 10 | 10 | 5 |
| colcothar | 5 | 5 | 5 | 5 | 5 |
| dioctyl phthalate | | 5 | | 5 | 5 |
| n-butanol | 3 | 3 | 3 | 3 | 3 |
| xylene | 5 | 5 | 5 | 5 | |

TABLE 5-continued

| Example | 34 | 35 | 36 | 37 | 38 |
|---|---|---|---|---|---|
| total | 100 | 100 | 100 | 100 | 100 |

TABLE 6

| | Coating use-up rate | | |
|---|---|---|---|
| Example | initial film thickness (μ) | film thickness after 3 months (μ) | used-up film thickness (μ) |
| 34 | 180 | 130 | 50 |
| 35 | 190 | 145 | 45 |
| 36 | 210 | 160 | 50 |
| 37 | 205 | 170 | 35 |
| 38 | 195 | 145 | 50 |

TABLE 7

Antifouling test
(surface area % adhered with submarine life)
duration of immersion (months)

| Example | 3 | 6 | 9 | 12 | 15 | 18 | 21 | 24 | 27 | 30 | 33 | 36 |
|---|---|---|---|---|---|---|---|---|---|---|---|---|
| 34 | 0 | 0 | 0 | 0 | 0 | 0 | 0 | 0 | 0 | 0 | 0 | 0 |
| 35 | 0 | 0 | 0 | 0 | 0 | 0 | 0 | 0 | 0 | 0 | 0 | 0 |
| 36 | 0 | 0 | 0 | 0 | 0 | 0 | 0 | 0 | 0 | 0 | 0 | 0 |
| 37 | 0 | 0 | 0 | 0 | 0 | 0 | 0 | 0 | 0 | 0 | 0 | 0 |
| 38 | 0 | 0 | 0 | 0 | 0 | 0 | 0 | 0 | 0 | 0 | 0 | 0 |

EXAMPLE 39

Into a similar reaction vessel as used in Example 1, were placed 100 parts of varnish A, 18 parts of di-n-propyl acetic acid and 7 parts of copper hydroxide, and the mixture was reacted as in Example 1 to obtain a green colored varnish V-19 having a solid content of 52.6 wt% and a viscosity of 2.8 poise.

The Cu content of the resin was 7.2 wt%.

EXAMPLE 40

Repeating the same procedures of Example 39 but using 15 parts of isononeic acid in place of 18 parts of di-n-propyl acetic acid, a resin varnish V-20 was obtained, whose solid content was 51.2 wt% and viscosity was 2.6 poise.

The Cu content of the resin was 7.1 wt%.

EXAMPLE 41

Repeating the same procedures of Example 39 but using 10 parts of pivalic acid in place of 18 parts of di-n-propyl acetic acid, a resin varnish V-21 having a solid content of 50.8 wt% and a viscosity of 3.2 poise was obtained.

The Cu content of the resin was 7.2 wt%.

EXAMPLE 42

Repeating the same procedures of Example 39 but using 24 parts of 2,4-dichlorophenoxy acetic acid in place of 18 parts of di-n-propyl acetic acid, a resin varnish V-22 having a solid content of 51.6 wt% and a viscosity of 4.2 poise was obtained.

The Cu content of the resin was 6.4 wt%.

EXAMPLES 43 TO 47

Repeating the same procedures as stated in Example 1 but using the following synthetic fatty acids in place of naphthenic acid, various varnishes (V-23 to V-27) were obtained.

| Example No. | synthetic fatty acid | amount parts | varnish No. | viscosity poise | solid % | Cu content of resin (wt %) |
|---|---|---|---|---|---|---|
| 43 | SA-9[1] | 18 | V-23 | 2.9 | 50.3 | 6.6 |
| 44 | SA-13[2] | 22 | V-24 | 2.2 | 51.2 | 6.4 |
| 45 | VA-10[3] | 19 | V-25 | 2.4 | 50.6 | 6.5 |
| 46 | HA-18GA[4] | 20 | V-26 | 2.6 | 51.8 | 6.2 |
| 47 | TCD—carboxylic acid S[5] | 28 | V-27 | 4.2 | 52.7 | 6.0 |

Note:
[1] branched type monocarboxylic acid, average carbon atoms 9, trademark of Idemitu Sekiyu
[2] branched type monocarboxylic acid, average carbon atoms 13, trademark of Idemitu Sekiyu
[3] branched type monocarboxylic acid, average carbon atoms 10, trademark of Shell Kasei
[4] 2-heptyl-undecanoic acid, trademark of Mitsubishi Kasei

[5] 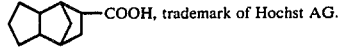—COOH, trademark of Hochst AG.

EXAMPLES 48 TO 56

Using the varnishes of Examples 39 to 47 and the materials shown in Table 8 and subjecting to a dispersion operation in ball mill for 5 hours, various coating compositions were prepared.

With these coating compositions, the same tests, i.e. coating use-up rate test and antifouling test, as given in Examples 14 to 28 were carried out and the test results were shown in Table 9 and Table 10.

TABLE 8

| Example | 48 | 49 | 50 | 51 | 52 | 53 | 54 | 55 | 56 |
|---|---|---|---|---|---|---|---|---|---|
| varnish | | | | | | | | | |
| V-19 | 45 | | | | | | | | |
| V-20 | | 40 | | | | | | | |
| V-21 | | | 45 | | | | | | |
| V-22 | | | | 40 | | | | | |
| V-23 | | | | | 45 | | | | |
| V-24 | | | | | | 40 | | | |
| V-25 | | | | | | | 45 | | |
| V-26 | | | | | | | | 45 | |
| V-27 | | | | | | | | | 45 |
| cuprous oxide | 25 | 25 | 30 | 20 | 15 | 20 | 30 | 30 | 30 |
| cuprous thiocyanate | | | | | | | | | |
| zinc white | 5 | 15 | 10 | 15 | 15 | 10 | | 15 | 15 |
| colloidal silica | 2 | 2 | 2 | 2 | 2 | 2 | 2 | 2 | 2 |
| titanium oxide | | 5 | 5 | 10 | 10 | 10 | 10 | | |
| colcothar | 5 | 5 | 5 | 5 | | 5 | | | |
| dioctyl phthalate | 5 | 5 | | 5 | 5 | 5 | | | |
| n-butanol | 3 | 3 | 3 | 3 | 3 | 3 | 3 | 3 | 3 |
| xylene | | | | | 5 | 5 | 10 | 5 | 5 |
| total | 100 | 100 | 100 | 100 | 100 | 100 | 100 | 100 | 100 |

TABLE 9

| | Coating use-up rate | | |
|---|---|---|---|
| Example | initial film thickness (μ) | film thickness after 3 months (μ) | used up film thickness (μ) |
| 48 | 195 | 155 | 40 |
| 49 | 180 | 145 | 35 |
| 50 | 175 | 125 | 50 |
| 51 | 200 | 170 | 30 |
| 52 | 185 | 140 | 45 |
| 53 | 190 | 140 | 50 |
| 54 | 210 | 170 | 40 |
| 55 | 180 | 145 | 35 |
| 56 | 170 | 130 | 40 |

TABLE 10

| | Antifouling test (surface area % adhered with submarine life) duration of immersion (months) | | | | | | | | | | | |
|---|---|---|---|---|---|---|---|---|---|---|---|---|
| Example | 3 | 6 | 9 | 12 | 15 | 18 | 21 | 24 | 27 | 30 | 33 | 36 |
| 48 | 0 | 0 | 0 | 0 | 0 | 0 | 0 | 0 | 0 | 0 | 0 | 0 |
| 49 | 0 | 0 | 0 | 0 | 0 | 0 | 0 | 0 | 0 | 0 | 0 | 0 |
| 50 | 0 | 0 | 0 | 0 | 0 | 0 | 0 | 0 | 0 | 0 | 0 | 0 |
| 51 | 0 | 0 | 0 | 0 | 0 | 0 | 0 | 0 | 0 | 0 | 0 | 0 |
| 52 | 0 | 0 | 0 | 0 | 0 | 0 | 0 | 0 | 0 | 0 | 0 | 0 |
| 53 | 0 | 0 | 0 | 0 | 0 | 0 | 0 | 0 | 0 | 0 | 0 | 0 |
| 54 | 0 | 0 | 0 | 0 | 0 | 0 | 0 | 0 | 0 | 0 | 0 | 0 |
| 55 | 0 | 0 | 0 | 0 | 0 | 0 | 0 | 0 | 0 | 0 | 0 | 0 |
| 56 | 0 | 0 | 0 | 0 | 0 | 0 | 0 | 0 | 0 | 0 | 0 | 0 |

The test results showed that the antifouling coating compositions of this invention can give a long lasting, excellent polishing antifouling effect in each case. The inventors have also found that the present antifouling coating compositions are no less better tha the heretofore proposed composition with trialkyl tin rich resin, in giving a stabilized, antifouling polishing effect.

What is claimed is:

1. An antifouling coating composition having improved polishing property and consisting essentially of a resin selected from the group consisting of an acrylic resin, a polyester resin and an epoxy resin, an organic solvent in which said resin is soluble, a pigment and other optional additives, wherein said resin has at least one side chain bearing at least one terminal group of the formula:

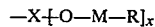

wherein X represents

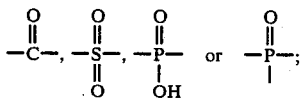

M is a metal selected from zinc, copper and tellurium; x is an integer of 1 to 2, R represents an organic acid residue selected from

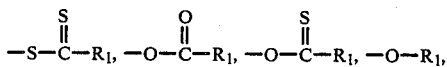

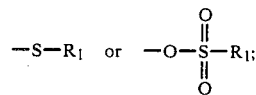

and $R_1$ is a monovalent organic residue, and the metal content of said resin is 0.3 to 20% by weight of the resin.

2. The composition according to claim 1 wherein R is a monovalent organic residue having an antifouling property.

3. The composition according to claim 1 wherein $R_1$ represents

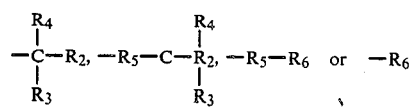

in which $R_2$ is hydrogen or a hydrocarbon residue having 1 to 12 carbon atoms, and $R_3$ and $R_4$ each represents a hydrocarbon residue having 1 to 12 carbon atoms, $R_5$ is a hydrocarbon residue having 1 to 4 carbon atoms and $R_6$ is a cyclic hydrocarbon having 5 to 12 carbon atoms.

4. The composition according to claim 1 wherein an antifouling agent is employed as the additive.

* * * * *